No. 808,738. PATENTED JAN. 2, 1906.
C. E. FISCHER.
COLLAPSIBLE TRUCK.
APPLICATION FILED SEPT. 3, 1904.
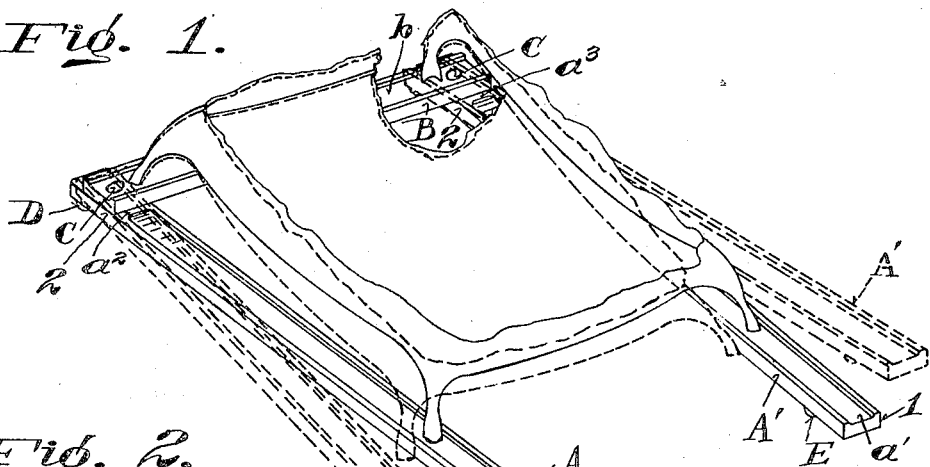
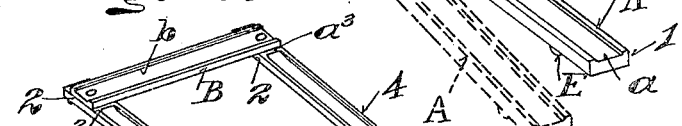
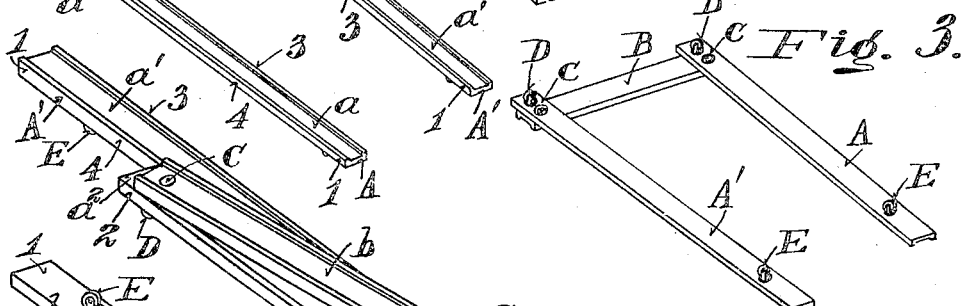
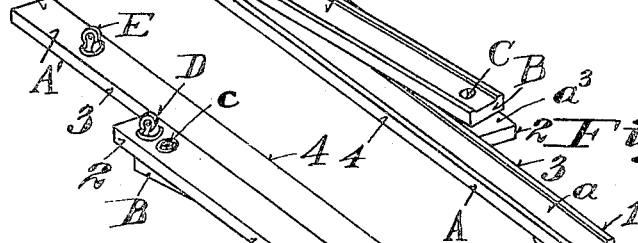
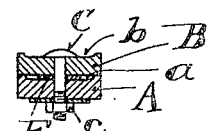
Witnesses.
Henry N. Bower
Herbert F. Harden
Inventor.
Charles E. Fischer
By A. F. Herbsleb, His Attorney

UNITED STATES PATENT OFFICE.

CHARLES E. FISCHER, OF WEST HARRISON, INDIANA.

COLLAPSIBLE TRUCK.

No. 808,738.     Specification of Letters Patent.     Patented Jan. 2, 1906.

Application filed September 3, 1904. Serial No. 223,194.

*To all whom it may concern:*

Be it known that I, CHARLES E. FISCHER, a citizen of the United States, residing at West Harrison, in the county of Dearborn and State of Indiana, have invented certain new and useful Improvements in Collapsible Trucks, of which the following is a specification.

It is the object of my invention to provide a new and improved collapsible truck of simple form, cheaply constructed, and which is especially applicable for moving stoves, barrels, and other packages about the household or in stores and which may be folded together in compact form in the novel manner hereinafter explained when not in use; and the invention consists in the construction, arrangement, and combinations of parts hereinafter more fully described and claimed.

In the drawings, Figure 1 is a perspective view of the truck in normal relation having a stove thereon, the latter being broken away, and also showing the truck in spread relation and the stove partly mounted thereon in dotted lines. Fig. 2 is a perspective view of the truck in normal relation. Fig. 3 is a perspective bottom view of the truck in normal relation. Fig. 4 is a perspective view of the truck in folded relation. Fig. 5 is a perspective bottom view of the truck in folded relation, and Fig. 6 is a detail in cross-section showing a washer interposed between the lengthwise piece and cross piece of the collapsible truck.

A A' are side pieces or pieces extending lengthwise of the truck. A cross-piece B connects these lengthwise pieces at one end of each of the latter by means of a pivot which is shown in the form of a bolt C, secured in place by a nut $c$, by means of which latter the pivotal connection can also be loosened or tightened at will. A caster D is secured to the under side of each of said lengthwise pieces at the pivotal end of the latter. A caster E is secured to the under side of each of said lengthwise pieces at the swinging end of the latter. The lengthwise pieces A A' are respectively preferably provided with grooves $a\ a'$ in their top faces, and the cross-piece B is preferably provided with a groove $b$ in its top face. The walls of these grooves serve the purpose of retaining the legs of the stove or other article that may be on the truck, preventing slippage thereof from the truck, the groove $b$ extending in a direction across the grooves $a\ a'$ when the truck is in normal position. The grooves $a\ a'$ preferably stop short of the pivotal end of the lengthwise pieces A A', forming top faces $a^2\ a^3$, respectively, on the pieces A A', on which the cross-piece B is supported. If desired, the grooves in the lengthwise pieces may be continued to the end of the latter and a washer F be interposed between the respective lengthwise pieces and the cross-piece, as shown in Fig. 6, for supporting the cross-piece and preventing its being caught by the walls of the groove in either lengthwise piece when the pieces are relatively swung for folding or unfolding the truck.

My improved device is especially well adapted for conveniently and easily handling stoves, barrels, or packages of various sizes. Thus illustrating the use of my improved device in moving a stove and referring to Fig. 1, the stove is first tilted or canted to one side, as shown in dotted lines, and the cross-piece B is placed under the legs which have been thus raised, the lengthwise pieces extending alongside the legs of the stove which are still on the floor. (Also shown in dotted lines.) The stove is then canted to its other side, raising the remaining legs of the stove off the floor, and the lengthwise pieces are swung inwardly on their pivots under the latter legs, thereby placing the stove upon the truck without at any time being obliged to raise its entire weight. Stoves and other articles of different sizes can be mounted on the truck in similar manner, the lengthwise pieces being permitted to extend at different angles from the cross-piece, the swinging ends of the lengthwise pieces being permitted to meet, if desired, for supporting articles.

1 denotes the swinging end, and 2 the pivoted end, of each of the lengthwise pieces, and 3 the inner side, and 4 the outer side, thereof when in normal position. The parts are so constructed that in folding the truck the swinging end of one of the lengthwise pieces is swung outwardly, and the pivoted end thereof is moved toward the other lengthwise piece for bringing the pivoted end of one of the lengthwise pieces between the pivoted end and the swinging end of the other lengthwise piece, thereby relatively reversing the lengthwise pieces end for end and bringing the outer side of one of said lengthwise pieces adjacent the inner side of the other lengthwise piece. (See Fig. 4.) When so arranged, the truck is collapsed or folded, but at the same time again forms a perfect truck, as shown in Figs. 4 and 5, upon which articles may be transported—as, for instance, the end of a long show-case may be placed upon the same for moving the show-case, the nuts $c$ being drawn up for rigidity, if desired.

Having thus fully described my invention, what I claim as new, and desire to secure by Letters Patent, is—

In a collapsible truck, the combination of the lengthwise pieces A A' respectively having the grooves $a\ a'$, the cross-piece B pivotally connected to both said lengthwise pieces at one end of the latter, said cross-piece having the groove $b$, a caster at each of said latter ends, and a caster at each of the other ends of said lengthwise pieces, said pieces folding by being swung on their pivots with said lengthwise pieces relatively reversed lengthwise and the outer side of one of said lengthwise pieces facing the inner side of the other of said lengthwise pieces, substantially as described.

In testimony whereof I have signed my name hereto in the presence of two subscribing witnesses.

CHARLES E. FISCHER.

Witnesses:
LOUIS DAHMANN,
A. F. HERBSLEB.